(12) United States Patent
Jewell et al.

(10) Patent No.: US 9,764,277 B2
(45) Date of Patent: Sep. 19, 2017

(54) SYNTHESIS GAS SEPARATION AND REFORMING PROCESS

(71) Applicants: Richard Peter Glynn Jewell, Saint Lambert (CA); Melissa Gaucher, Saint-Damase (CA); Louis Denomme, Boucherville (CA)

(72) Inventors: Richard Peter Glynn Jewell, Saint Lambert (CA); Melissa Gaucher, Saint-Damase (CA); Louis Denomme, Boucherville (CA)

(73) Assignee: Enerkem, Inc., Montreal, Quebec (CA)

( * ) Notice: Subject to any disclaimer, the term of this patent is extended or adjusted under 35 U.S.C. 154(b) by 202 days.

(21) Appl. No.: 14/031,182

(22) Filed: Sep. 19, 2013

(65) Prior Publication Data

US 2014/0086818 A1 Mar. 27, 2014

Related U.S. Application Data

(60) Provisional application No. 61/705,728, filed on Sep. 26, 2012.

(51) Int. Cl.
*B01D 53/22* (2006.01)
*C01B 3/54* (2006.01)
(Continued)

(52) U.S. Cl.
CPC .......... *B01D 53/229* (2013.01); *C01B 3/38* (2013.01); *C01B 3/501* (2013.01); *C01B 3/52* (2013.01); *C01B 3/54* (2013.01); *C01B 3/56* (2013.01); *C01B 3/58* (2013.01); *C10K 1/00* (2013.01); *C10K 1/10* (2013.01); *C10K 1/32* (2013.01); *C10K 3/001* (2013.01); *C10K 3/04* (2013.01); *B01D 2256/16* (2013.01); *B01D 2256/20* (2013.01); *C01B 2203/0244* (2013.01); *C01B 2203/043* (2013.01); *C01B 2203/0405* (2013.01); *C01B 2203/047* (2013.01); *C01B 2203/048* (2013.01); *C01B 2203/0415* (2013.01); *C01B 2203/0475* (2013.01); *C01B 2203/1241* (2013.01); *C01B 2203/146* (2013.01)

(58) Field of Classification Search
CPC ................................................. B01D 53/229
See application file for complete search history.

(56) References Cited

U.S. PATENT DOCUMENTS 3,699,218 A * 10/1972 Smith et al. ............... 423/650
5,073,356 A * 12/1991 Guro et al. ............... 423/418.2
(Continued)

FOREIGN PATENT DOCUMENTS

DE 3501457 A 7/1986
EP 0342610 * 11/1989
(Continued)

*Primary Examiner* — Douglas B Call
(74) *Attorney, Agent, or Firm* — Raymond J. Lillie

(57) ABSTRACT

A method of obtaining purified hydrogen and purified carbon monoxide from crude synthesis gas. A first crude synthesis gas stream is passed through a first separation zone to separate a hydrogen stream from a stream comprising carbon monoxide and methane. The carbon monoxide and methane are subjected to thermal reforming to produce a second crude synthesis gas, which is passed through a second separation zone to separate carbon monoxide from the second crude synthesis gas stream.

23 Claims, 2 Drawing Sheets

(51) Int. Cl.

| | |
|---|---|
| *C01B 3/58* | (2006.01) |
| *C01B 3/50* | (2006.01) |
| *C01B 3/52* | (2006.01) |
| *C01B 3/56* | (2006.01) |
| *C10K 1/00* | (2006.01) |
| *C10K 1/10* | (2006.01) |
| *C10K 1/32* | (2006.01) |
| *C10K 3/00* | (2006.01) |
| *C10K 3/04* | (2006.01) |
| *C01B 3/38* | (2006.01) |

(56) References Cited

U.S. PATENT DOCUMENTS

| | | | |
|---|---|---|---|
| 5,102,645 A * | 4/1992 | Fisher et al. | 423/418.2 |
| 5,980,857 A | 11/1999 | Kapoor et al. | |
| 6,340,382 B1 * | 1/2002 | Baksh | C01B 3/56 |
| | | | 95/117 |
| 7,332,146 B1 | 2/2008 | Huang et al. | |
| 7,985,399 B2 | 7/2011 | Drnevich et al. | |
| 2004/0170558 A1 * | 9/2004 | Hershkowitz | 423/652 |
| 2005/0056661 A1 * | 3/2005 | Casamatta | H01M 8/04089 |
| | | | 222/3 |
| 2005/0066813 A1 | 3/2005 | Dunn | |
| 2007/0140954 A1 * | 6/2007 | Tio | B01J 8/008 |
| | | | 423/650 |
| 2010/0015023 A1 * | 1/2010 | Takatsu | B01J 35/002 |
| | | | 423/247 |
| 2012/0329645 A1 * | 12/2012 | Skjoth-Rasmussen | B01J 23/8946 |
| | | | 502/327 |
| 2013/0131398 A1 * | 5/2013 | Warner | C07C 29/149 |
| | | | 568/885 |
| 2013/0139687 A1 * | 6/2013 | Weiss | B01D 53/1493 |
| | | | 95/171 |
| 2014/0061540 A1 * | 3/2014 | Long | B01D 53/02 |
| | | | 252/373 |

FOREIGN PATENT DOCUMENTS

| | | | |
|---|---|---|---|
| WO | 2011/113611 | * | 9/2011 |
| WO | WO 2012/122233 | * | 9/2012 |

* cited by examiner

SYNTHESIS GAS SEPARATION AND REFORMING PROCESS

This application claims priority based on provisional Application Ser. No. 61/705,728, filed Sep. 26, 2012, the contents of which are incorporated by reference in their entirety.

This invention relates to the separation of gaseous components from streams of crude synthesis gas. More particularly, this invention relates to the use of separation zones or systems, which may include membranes, for separating hydrogen and carbon monoxide gas streams from crude synthesis gas.

In accordance with an aspect of the present invention, there is provided a method of obtaining purified hydrogen and purified carbon monoxide from crude synthesis gas. The method comprises passing a first crude synthesis gas stream, which comprises hydrogen, carbon monoxide, and methane, and may further compromise other permanent minor gas components, through a first separation zone. The first crude synthesis gas stream is separated into a first stream comprising hydrogen and a second stream comprising carbon monoxide and methane. The second stream comprising carbon monoxide and methane is subjected to thermal reforming (which may be in the presence of a catalyst) to provide a second crude synthesis gas stream comprising hydrogen, carbon monoxide, and carbon dioxide. The second crude synthesis gas stream is passed through a second separation zone, thereby separating the second synthesis gas stream into a stream comprising carbon monoxide and a stream comprising hydrogen and carbon dioxide.

In a non-limiting embodiment, the first separation zone comprises a membrane which is permeable to hydrogen, but retains carbon monoxide and methane. Thus, as the first crude synthesis gas stream is passed over the membrane surface, hydrogen passes through the membrane, while carbon monoxide and methane are retained on the membrane. Such membranes include, but are not limited to, hollow fiber membranes such as PRISM™, POLYSEP™, VAPORSEP™, other polymeric membranes, spiral wound membranes, ceramic membranes, metal membranes, or other separation systems which provide for a permeate rich in hydrogen and a retentate rich in carbon monoxide (CO), or rich in both carbon monoxide and methane. Examples of such membranes also are described in U.S. Pat. No. 8,080,693, the contents of which are incorporated by reference.

In another non-limiting embodiment, the first separation zone further includes, in addition to the membrane, a heat exchanger, whereby heat is provided to the first separation zone. In one non-limiting embodiment, steam (or another medium of heat) is injected into the heat exchanger to provide heat to the synthesis gas in the first separation zone. In another non-limiting embodiment, an electric or direct fired heat source is used to heat the synthesis gas.

In yet another non-limiting embodiment, the first separation zone further includes a coalescing filter and a particulate filter. The coalescing filter and particulate filter may be parts of a single filtering unit, or may be separate filtering units, depending on the condition and purity of the feed gas.

In a further non-limiting embodiment, the first separation zone includes a coalescing filter, a particulate filter, a heat exchanger into which steam is injected, and a membrane which is permeable to hydrogen but retains carbon monoxide and methane. In yet another non-limiting embodiment, nitrogen also is retained by the membrane.

In a non-limiting embodiment, the first separation zone is operated at a temperature of from about 4° C. to about 450° C., and a pressure of from about 100 psi to about 1,250 psi. In another non-limiting embodiment, the first separation zone is operated at a temperature of from about 25° C. to about 120° C., and a pressure of from about 200 psi to about 1,100 psi.

In another non-limiting embodiment, once the stream comprising hydrogen is withdrawn from the first separation zone, such stream is passed through a third separation zone to obtain a second stream comprising hydrogen and a tail gas stream comprising carbon dioxide and carbon monoxide. The second stream comprising hydrogen has a higher purity than the first stream comprising hydrogen.

In a non-limiting embodiment, the third separation zone includes a pressure swing adsorption, or PSA unit, in which carbon dioxide, carbon monoxide, and other contaminants are removed in order to provide a purified hydrogen stream that can be used, for example, in hydrogenolysis reactions, such as, for example, in producing alcohols from acetates.

In a non-limiting embodiment, the pressure swing adsorption unit includes one or more adsorption vessels, that is (are) packed with one or more adsorbents, such as, for example, metal-organic framework, or MOF, adsorbents having high surface area, structural flexibility, and/or open metal cation sites, activated alumina, activated carbon and/or zeolite adsorbents. As the hydrogen-rich gas from the first separation zone is passed through the pressure swing adsorption unit, impurities such as carbon dioxide, carbon monoxide, and other impurities such as methane, hydrocarbons, and water are adsorbed selectively and temporarily at an elevated pressure, where an essentially pure (e.g., 99.99%) hydrogen gas passes through the pressure swing adsorption system.

In a non-limiting embodiment, the third separation zone includes a solvent-based scrubber unit that removes impurities from the hydrogen-rich stream. Such impurities include, but are not limited to, carbon dioxide, methane, alkanes, and alkenes. These impurities may be used in downstream applications.

In another non-limiting embodiment, the solvent-based scrubber unit is a chilled methanol scrubber unit. In yet another non-limiting embodiment, the third separation zone includes a methanol scrubber unit, which is used in conjunction with one or more adsorption vessels, refrigeration and heat exchange units, one or more stripping or desorption columns, and/or a methanol recirculation pumping facility.

In yet another non-limiting embodiment, the third separation zone includes one or more membranes that are permeable to hydrogen, but have negligible permeabilities with respect to other gases. Such membranes include, but are not limited to, membranes formed from polymeric materials, such as VAPORSEP™ membranes, and Generon IGS membranes, membranes from metals or metal alloys, such as membranes formed from palladium or alloys of palladium and yttrium, copper, ruthenium, indium, and/or silver. Examples of such membranes include palladium membranes from Hy2, and palladium alloy membranes as described in Burkhanov, et al., *Platinum Metals Review*, Vol. 55, No. 1, pgs. 3-12 (2011), the contents of which are incorporated herein by reference.

The carbon monoxide and methane that are separated from a hydrogen-rich gas in the first separation zone then are subjected to thermal reforming (which may be in the presence of a catalyst) to provide a second crude synthesis gas stream including hydrogen, carbon monoxide, and carbon dioxide. The thermal reforming may take place in the presence of steam, oxygen, or oxygen and steam, or steam and $CO_2$, or steam, oxygen, and $CO_2$.

In a non-limiting embodiment, the carbon monoxide and methane are subjected to partial oxidation and thermal reforming in the presence of steam. In another non-limiting embodiment, the steam reforming is conducted at an equilibrium temperature of from about 50° C. to about 1,300° C., and at a pressure of from about 30 psi to about 900 psi. In another non-limiting embodiment, the steam reforming is conducted at a pressure of from about 250 psi to about 750 psi. In yet another non-limiting embodiment, the steam reforming is conducted at a temperature of from about 200° C. to about 1,050° C., and at a pressure of from about 300 psi to about 600 psi. In yet another non-limiting embodiment, the steam reforming is conducted at a temperature of from about 400° C. to about 1,000° C. and a pressure of from about 300 psi to about 450 psi.

In another non-limiting embodiment, the thermal reforming of the carbon monoxide and methane is conducted in the presence of a catalyst. Catalysts which may be employed include, but are not limited to, nickel-based catalysts such as BASF ATR catalyst RM-47, and primary reforming catalysts such as C12, Clarient reforming catalyst type C14-2LDP, Clarient secondary reforming catalyst type C14-4GG, and catalysts comprising low silica formulations of nickel oxide dispersed on alpha-alumina ceramic supports.

In a non-limiting embodiment, the thermal reforming is conducted in the presence of steam in an autothermal reforming unit, which contains a steam generator, a heat exchanger, and an autothermal reformer, which contains a catalyst bed. A carbon monoxide, methane, and steam mixture, or an oxygen and steam mixture or an oxygen and steam and $CO_2$ mixture are passed to the autothermal reformer, where partial oxidation reactions and reforming reactions take place in the presence of a catalyst bed.

The autothermal reformer, in a non-limiting embodiment, has an initial inlet mixing zone, where the carbon monoxide and methane, and the steam and oxygen mixture or the steam and oxygen and $CO_2$ mixture are mixed. The carbon monoxide and methane, and oxygen and steam or oxygen, steam, and $CO_2$ then are passed over a catalyst bed. The catalyst bed includes a short inlet section where partial oxidation reactions and heat generation take place, followed by a longer reforming reaction zone where endothermic reforming reactions take place. Heat energy needed to support the reforming reactions' heat requirement is generated in the inlet section of the catalyst bed by the partial oxidation reactions, with conduction and convection processes heating the rest of the catalyst bed. When the reforming is conducted at a temperature above 600° C., radiation processes may take place as well.

Typical combustion reactions which take place in the inlet section of the reformer are as follows:

$$2CH_4+O_2 \rightarrow 2CO+4H_2$$

$$CH_4+2O_2 \rightarrow CO_2+2H_2O$$

$$C_nH_{(2n+2)}+[n+((2n+2)/4)]O_2 \rightarrow nCO_2+((2n+2)/2)H_2O,$$
where $n$ is an integer of at least 1.

$$C_nH_{(2n)}+[n+(n/2)]O_2 \rightarrow nCO_2+nH_2O, \text{ where } n \text{ is an integer of at least 2.}$$

$$2CO+O_2 \rightarrow 2CO_2$$

$$2H_2+O_2 \rightarrow 2H_2O$$

The reactions which take place in the reforming reaction zone are as follows:

$$CH_4+H_2O \leftrightharpoons CO+3H_2$$

$$H_2O+CO \leftrightharpoons H_2+CO_2$$

$$CH_4+2H_2O \rightarrow 4H_2+CO_2$$

Thus, in the autothermal reformer, there is formed a second crude synthesis gas stream which includes carbon monoxide, hydrogen, and carbon dioxide, and also may include water. Excess water is removed prior to passing the second crude synthesis gas stream to the second separation zone. The second crude synthesis gas stream then is passed to the second separation zone, whereby the second crude synthesis gas stream is separated into a stream comprising carbon monoxide and a stream comprising hydrogen and carbon dioxide. In a non-limiting embodiment, the stream comprising hydrogen and carbon dioxide further comprises water.

In a non-limiting embodiment, the second separation zone comprises at least one membrane which is permeable to hydrogen, but retains carbon monoxide. The at least one membrane separates the majority of the hydrogen and some of the carbon dioxide from the carbon monoxide and other components that may be present. The membrane may, in a non-limiting embodiment, be a membrane or a series of membranes selected from those that are used in the first separation zone. It is to be understood, however, that the membranes used in the first and second separation zones are not limited to the membranes described specifically herein.

In a non-limiting embodiment, the second separation zone further includes a heat exchanger, into which steam or another heated gas may be injected. Alternatively, the heat may be provided by electricity or direct fire. In another non-limiting embodiment, the second separation zone further includes at least one of a coalescing filter and a particulate filter. The coalescing filter and particulate filter may be parts of a single filtering unit or may be separate filtering units, depending on the condition and purity of the feed gas.

In yet another non-limiting embodiment, the second separation zone includes a coalescing filter, a particulate filter, a heat exchanger, and a membrane which is permeable to hydrogen, carbon dioxide, and water, but retains carbon monoxide.

In a non-limiting embodiment, the second separation zone is operated at a temperature of from about 4° C. to about 120° C., and a pressure of from about 10 psi to about 1,250 psi. In another non-limiting embodiment, the second separation zone is operated at a temperature of from about 50° C. to about 100° C., and a pressure of from about 30 psi to about 700 psi.

In another non-limiting embodiment, the second separation zone comprises a carbon monoxide pressure swing adsorption zone, such as a carbon monoxide vacuum pressure swing adsorption zone, which separates carbon monoxide from hydrogen, carbon dioxide, water, and other components, such as methane.

In another non-limiting embodiment, the second separation zone comprises one or more membranes as hereinabove described, and a pressure swing adsorption zone as hereinabove described.

In another non-limiting embodiment, the carbon monoxide that is retained on the membrane of the second separation zone, and/or is separated from other components in a pressure swing adsorption zone, is withdrawn from the second separation zone, and then may be used in chemical reactions, such as in the carbonylation of alcohols to produce acetates.

In another non-limiting embodiment, prior to using the carbon monoxide in chemical reactions, a gas stream comprising the carbon monoxide that was retained on the membrane of the second separation zone, or was separated from hydrogen, carbon dioxide, water, and other components such as methane, in a carbon monoxide vacuum pressure swing adsorption zone, is passed to a fourth separation zone, which may be a carbon monoxide pressure swing adsorption zone, or a carbon monoxide vacuum pressure swing adsorption zone, whereby impurities such as any remaining carbon dioxide and methane are removed from the carbon monoxide-rich gas.

BRIEF DESCRIPTION OF THE DRAWINGS

The invention now will be described with respect to the drawings, wherein.

Figure 1:
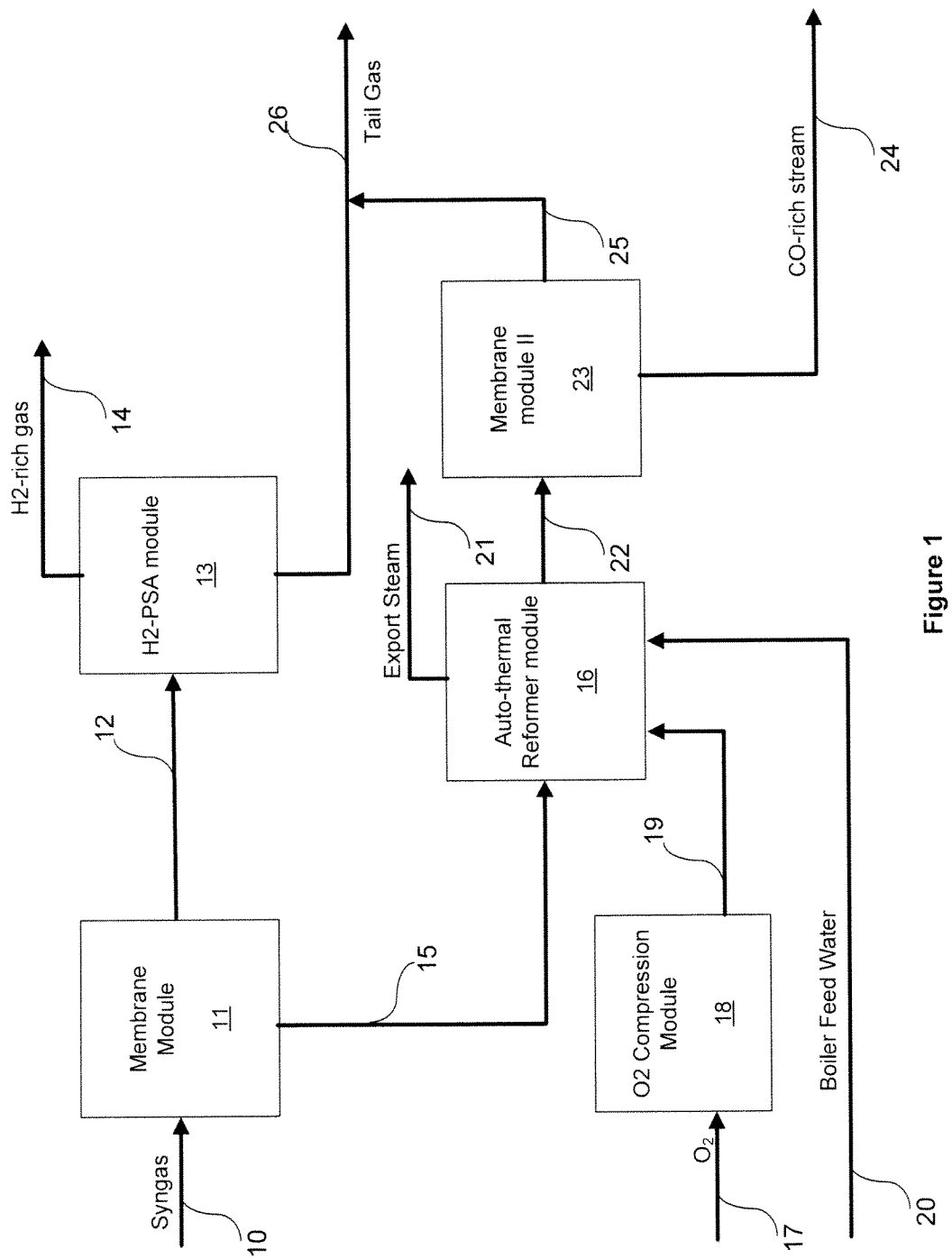
FIG. 1 is a schematic of a first non-limiting embodiment of the method of the present invention.

Referring now to the drawings, as shown in FIG. 1, a stream of crude synthesis gas in line 10 is passed to a membrane separation module 11, whereby a stream comprised mainly of hydrogen is separated from other components of the crude synthesis gas that includes carbon monoxide and methane. In general, membrane separation module 11 includes a membrane that is permeable to hydrogen, and significantly less permeable to carbon monoxide and methane. Thus, as the crude synthesis gas contacts the membrane in membrane separation module 11, the hydrogen passes through the membrane while carbon monoxide and methane are retained on the membrane. In addition to the membrane, membrane separation module 11 also may include a coalescing filter, a particulate filter, and/or a heat exchanger into which steam is injected. In general, membrane separation module 11 is operated at a temperature of from about 4° C. to about 450° C., and a pressure of from about 100 psi to about 1,250 psi.

The hydrogen-containing stream which passes through the membrane separation module 11 is withdrawn from membrane separation module 11 through line 12 and passed to a hydrogen/pressure swing adsorption module 13, in which the hydrogen-containing stream is subjected to further purification.

Hydrogen/pressure swing adsorption module 13, in general, includes a pressure swing adsorption unit in which carbon dioxide, carbon monoxide, and other contaminants are removed in order to provide a purified hydrogen stream. The pressure swing adsorption unit may include one or more adsorption units that is (are) packed with one or more adsorbents, such as activated carbon or zeolites. In addition to the pressure swing adsorption unit(s), the module 13 also may include a coalescing filter, a particulate filter, and/or a heat exchanger into which cooling fluids may be injected. As the hydrogen-containing stream is passed through the pressure swing adsorption unit of the module 13, impurities such as carbon dioxide, carbon monoxide, and residual hydrogen, methane, hydrocarbons, and water are adsorbed selectively and temporarily at an elevated pressure, while an essentially pure hydrogen gas is withdrawn from module 13 through line 14. The purified hydrogen gas then may be subjected to a variety of uses. For example, the purified hydrogen gas may be used in hydrogenolysis reactions to produce alcohols from acetates, as well as in hydrogenation reactions that convert unsaturated hydrocarbons to saturated hydrocarbons. The impurities are withdrawn from module 13 as a tail gas stream through line 26. The tail gas stream contains a mixture of gases that can be used as a fuel, or may be recycled upstream, or may be used as feed chemicals for other chemical reactions.

The carbon monoxide and methane that were retained by the membrane in membrane module 11 are withdrawn from membrane module 11 through line 15 and passed to autothermal reformer module 16, in which the carbon monoxide and methane are subjected to steam reforming. The steam reforming takes place in the presence of oxygen and steam. Oxygen in line 17 is passed to oxygen compression module 18. Compressed oxygen is withdrawn from oxygen compression module 18 through line 19 and passed to autothermal reformer module 16. Boiler feed water enters autothermal reformer module 16 from line 20.

Autothermal reformer module 16 includes a steam generator, a heat exchanger, and an autothermal reformer including a catalyst bed. In the autothermal reformer module 16, the carbon monoxide and methane are reacted with oxygen, and with steam that is produced from the boiler feed water from line 20, to produce a crude synthesis gas having the same or a different composition as the crude synthesis gas in line 10, and that includes carbon monoxide, hydrogen, and carbon dioxide, and also may include water. In general, the autothermal reformer of autothermal reformer unit 16 is operated at an equilibrium temperature of from about 200° C. to about 1,300° C., and a pressure of from about 250 psi to about 750 psi.

After the carbon monoxide and methane are reacted with oxygen and steam in autothermal reformer module 16 to produce a crude synthesis gas, residual steam is withdrawn from autothermal reformer module 16 through line 21, while the crude synthesis gas is withdrawn from autothermal reformer module 16 through line 22, and passed to membrane separation module 23.

Membrane separation module 23 includes a membrane which is permeable to hydrogen, but retains carbon monoxide. Membrane separation module 23 also may include a coalescing filter, a particulate filter, and/or a heat exchanger, into which steam may be injected. As the crude synthesis gas is passed through membrane separation module 23, the membrane separates the majority of the hydrogen and some of the carbon dioxide from the carbon monoxide and other components that may be present. In general, the membrane separation module 23 is operated at a temperature of from about 4° C. to about 120° C., and a pressure of from about 10 psi to about 1,250 psi.

Hydrogen and some of the carbon dioxide pass through the membrane in membrane separation module 23, and are withdrawn from membrane separation module 23 through line 25, and then mixed with the tail gas in line 26. A carbon monoxide-rich gas, which is retained by the membrane, is withdrawn from membrane separation module 23 through line 24. The carbon monoxide then may be used in a variety of chemical reactions. For example, the carbon monoxide may be used in the carbonylation of alcohols to produce acetates.

Figure 2:
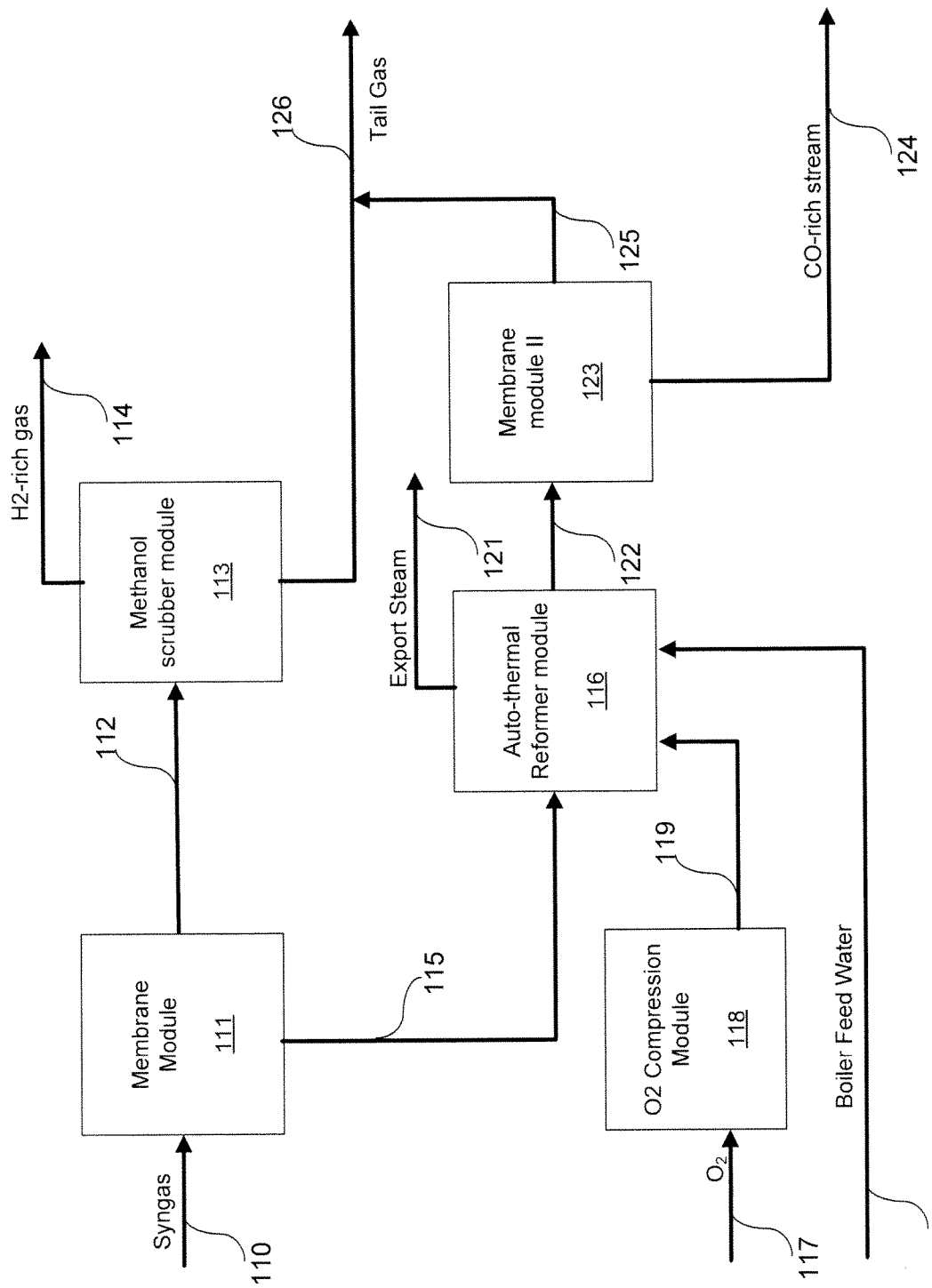
FIG. 2 is a schematic of a second non-limiting embodiment of the method of the present invention.

In another non-limiting embodiment, as shown in FIG. 2, a stream of crude synthesis gas in line 110 is passed to a membrane separation module 111, whereby a stream comprised mainly of hydrogen is separated from other components of the crude synthesis gas, that includes carbon monoxide and methane. Membrane separation module 111 includes a membrane that is permeable to hydrogen, and significantly less permeable to carbon monoxide and methane. As the crude synthesis gas contacts the membrane in membrane separation module 111, the hydrogen passes through the membrane while carbon monoxide and methane are retained on the membrane. Membrane separation module 111 also may include a coalescing filter, a particulate filter, and/or a heat exchanger into which steam is injected. Membrane separation module 111 is operated at a temperature of from about 4° C. to about 450° C., and a pressure of from about 100 psi to about 1,250 psi.

The hydrogen-containing stream which passes through the membrane separation module 111 is withdrawn from membrane separation module 111 through line 112 and passed to a chilled methanol scrubber module 113, in which the hydrogen-containing stream is subjected to further purification.

Chilled methanol scrubber module 113, in general, includes a chilled methanol scrubber unit in which carbon dioxide, carbon monoxide, and other contaminants are removed in order to provide a purified hydrogen stream. In addition to the chilled methanol scrubber unit, the module 113 also may include one or more adsorption vessels, refrigeration and heat exchange units, one or more stripping or desorption columns, and/or a methanol recirculation pumping facility. As the hydrogen-containing stream is passed through the scrubber of the module 113, impurities such as carbon dioxide, methane, hydrocarbons, and water are removed, while an essentially pure hydrogen gas is withdrawn from module 113 through line 114. The purified hydrogen gas then may be subjected to a variety of uses. The impurities are withdrawn from module 113 as a tail gas stream through line 126. The tail gas stream contains a mixture of gases that can be used as a fuel, or may be recycled upstream, or may be used as feed chemicals for other chemical reactions.

The carbon monoxide and methane that were retained by the membrane in membrane module 111 are withdrawn from membrane module 111 through line 115 and passed to autothermal reformer module 116, in which the carbon monoxide and methane are subjected to steam reforming. The steam reforming takes place in the presence of oxygen and steam. Oxygen in line 117 is passed to oxygen compression module 118. Compressed oxygen is withdrawn from oxygen compression module 118 through line 119 and passed to autothermal reformer module 116. Boiler feed water enters autothermal reformer module 116 from line 120.

Autothermal reformer module 116 includes a steam generator, a heat exchanger, and an autothermal reformer including a catalyst bed. In the autothermal reformer module 116, the carbon monoxide and methane are reacted with oxygen, and with steam that is produced from the boiler feed water from line 120, to produce a crude synthesis gas having the same or a different composition as the crude synthesis gas in line 110, and that includes carbon monoxide, hydrogen, and carbon dioxide, and also may include water. The autothermal reformer of autothermal reformer unit 116 is operated at an equilibrium temperature of from about 200° C. to about 1,300° C., and a pressure of from about 250 psi to about 750 psi.

After the carbon monoxide and methane are reacted with oxygen and steam in autothermal reformer module 116 to produce a crude synthesis gas, residual steam is withdrawn from autothermal reformer module 116 through line 121, while the crude synthesis gas is withdrawn from autothermal reformer module 116 through line 122, and passed to membrane separation module 123.

Membrane separation module 123 includes a membrane which is permeable to hydrogen, but retains carbon monoxide. Membrane separation module 123 also may include a coalescing filter, a particulate filter, and/or a heat exchanger, into which steam may be injected. As the crude synthesis gas is passed through membrane separation module 123, the membrane separates the majority of the hydrogen and some of the carbon dioxide from the carbon monoxide and other components that may be present. The membrane separation module 123 is operated at a temperature of from about 4° C. to about 120° C., and a pressure of from about 10 psi to about 1,250 psi.

Hydrogen and some of the carbon dioxide pass through the membrane in membrane separation module 123, and are withdrawn from membrane separation module 123 through line 125, and then mixed with the tail gas in line 126. A carbon monoxide-rich gas, which is retained by the membrane, is withdrawn from membrane separation module 123 through line 124. The carbon monoxide then may be used in a variety of chemical reactions as noted hereinabove.

The disclosures of all patents and publications (including published patent applications) are incorporated herein by reference to the same extent as if each patent and publication were incorporated individually by reference.

It is to be understood, however, that the scope of the present invention is not to be limited to the specific embodiments described above. The invention may be practiced other than as particularly described and still be within the scope of the accompanying claims.

What is claimed is:

1. A method of obtaining purified hydrogen and purified carbon monoxide from crude synthesis gas, said crude synthesis gas containing hydrogen, carbon monoxide, and methane, said method comprising:
   (a) passing a first crude synthesis gas stream, said first crude synthesis gas stream comprising hydrogen, carbon monoxide, and methane through a first separation zone at a temperature from 4° C. to 450° C. and at a pressure from 100 psi to 1,250 psi, thereby separating said first crude synthesis gas stream into a first stream comprising hydrogen and a second stream comprising carbon monoxide and methane;
   (b) reacting said second stream of step (a) comprising carbon monoxide and methane with oxygen and steam in an autothermal reformer, at a pressure of from about 300 psi to about 600 psi to produce a second crude synthesis gas stream comprising hydrogen, carbon monoxide, carbon dioxide, and residual water; and
   (c) passing said second crude synthesis gas stream through a second separation zone, thereby separating said second crude synthesis gas stream into a stream comprising carbon monoxide and a stream comprising hydrogen and carbon dioxide.

2. The method of claim 1, and further comprising:
   (d) passing said first stream comprising hydrogen obtained in step (a) directly through a third separation zone to obtain a second stream comprising hydrogen and a tail gas stream comprising carbon dioxide and carbon monoxide, wherein said second stream comprising hydrogen has a higher purity than said first stream comprising hydrogen.

3. The method of claim 2, and further comprising:
   (e) passing said stream comprising carbon monoxide from step (c) directly through a fourth separation zone, to obtain a stream comprising carbon dioxide and a stream comprising carbon monoxide, said stream comprising carbon monoxide having a higher purity than said stream comprising carbon monoxide from step (c).

4. The method of claim 3, and further comprising:
(f) carbonylating at least one alcohol with said carbon monoxide produced in step (e) to produce at least one acetate.

5. The method of claim 2 wherein said third separation zone includes a solvent-based scrubber unit.

6. The method of claim 5 wherein said solvent-based scrubber unit is a chilled methanol scrubber unit.

7. The method of claim 2, and further comprising:
subjecting at least one acetate to hydrogenolysis with said second stream comprising hydrogen to produce at least one alcohol.

8. The method of claim 2 wherein said third separation zone includes a chilled methanol scrubber having one or more adsorption vessels, one or more refrigeration units, and one or more heat exchange units, one or more stripping or desorption columns, and a methanol recirculation pumping facility.

9. The method of claim 2 wherein said first separation zone contains a membrane and said third separation zone contains a chilled methanol scrubber, wherein carbon dioxide, methane, hydrocarbons, and water are removed to provide essentially pure hydrogen gas of at least 99.99% hydrogen.

10. The method of claim 1 wherein, in step (b), said second stream comprising carbon monoxide and methane is subjected to steam reforming in the presence of oxygen and steam.

11. The method of claim 1 wherein said first separation zone comprises a membrane which is permeable to hydrogen and retains carbon monoxide and methane.

12. The method of claim 1, wherein, in step (c), said stream comprising hydrogen and carbon dioxide further comprises water.

13. The method of claim 1 wherein said second separation zone comprises at least one membrane which is permeable to hydrogen, carbon dioxide, and water, and is impermeable to carbon monoxide.

14. The method of claim 1 wherein, in step (b), said second stream comprising carbon monoxide and methane is subjected to autothermal reforming in the presence of a catalyst.

15. The method of claim 1 wherein said second separation zone comprises a carbon monoxide pressure swing adsorption zone.

16. The method of claim 1 wherein said second separation zone comprises (i) a membrane which is permeable to hydrogen and retains carbon monoxide and methane; and (ii) a carbon monoxide pressure swing adsorption zone.

17. The method of claim 1 wherein said first separation zone is operated at a pressure of from about 200 psi to about 1,100 psi.

18. The method of claim 1 wherein said first separation zone is operated at a temperature of from about 25° C. to about 120° C.

19. The method of claim 1 wherein said second separation zone is operated at a temperature of from about 50° C. to about 100° C.

20. The method of claim 1 wherein said autothermal reforming is effected in the presence of a catalyst comprising nickel oxide supported on an alpha alumina support.

21. The method of claim 1, and further comprising:
carbonylating at least one alcohol with said carbon monoxide produced in step (c) to produce at least one acetate.

22. The method of claim 1 wherein said first separation zone includes a coalescing filter.

23. The method of claim 1 wherein said reacting of said second stream of step (a) with oxygen and steam is conducted at a pressure of from about 300 psi to about 450 psi.

* * * * *